March 10, 1964     R. W. PARKER     3,124,006
DUST-EXCLUDING SLEEVE FOR RACK AND PINION STEERING GEAR
Filed March 30, 1962
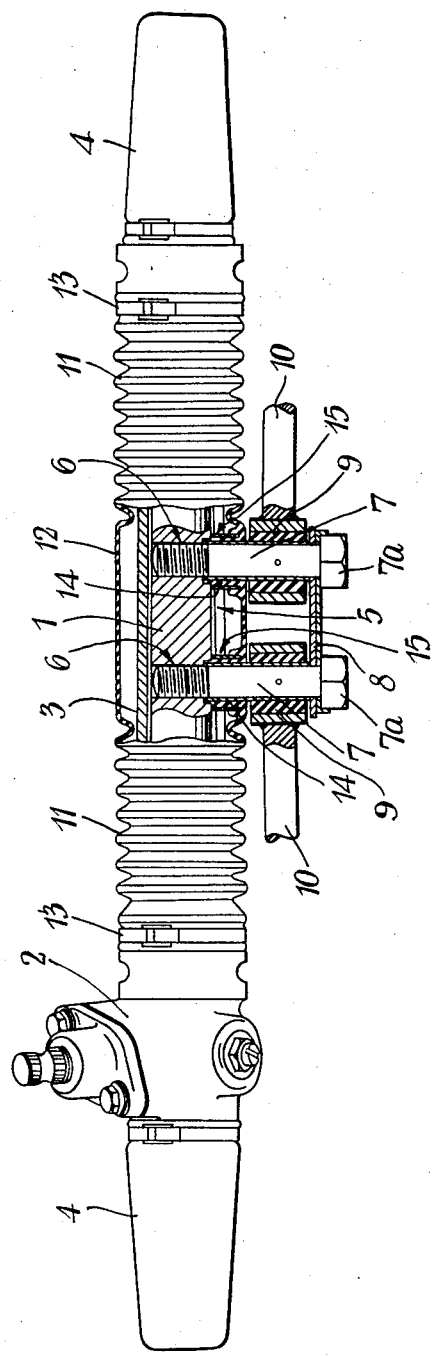

3,124,006
DUST-EXCLUDING SLEEVE FOR RACK AND
PINION STEERING GEAR
Robert William Parker, Clevedon, Somerset, England, assignor to Engineering Productions (Clevedon) Limited, Clevedon, Somerset, England, a British company
Filed Mar. 30, 1962, Ser. No. 183,894
Claims priority, application Great Britain Apr. 7, 1961
5 Claims. (Cl. 74—18.2)

This invention relates to flexible dust-excluding sleeves for use with rack and pinion steering gear in which the rack is mounted to move axially in a casing and is connectible with steering rods or links by overhanging bolts which engage the rack through a slot in the casing wall. Hereinafter, such rack and pinion steering gear will be referred to as "steering gear as defined."

A main object of the invention is to facilitate the effective sealing of steering gear as defined against the ingress of dust and dirt and accordingly, the inveniton provides a flexible dust-excluding sleeve which can be engaged over the casing and clamped therearound at or beyond opposite ends of the slot in the wall thereof to seal off the slot, the sleeve being formed, intermediate its ends, with flanged bolt holes which are reinforced against distortion and are dimensioned to provide a sealing fit around each of the overhanging bolts which project through the casing slot. The flanges around the bolt holes are preferably on the inside of the sleeve and project into the casing slot, the reinforcements being provided by metallic or non-metallic stiffening collars which are secured around the flanges.

In order that the invention may be clearly understood and readily carried into effect, an embodiment thereof will now be described in detail with reference to the accompanying drawing which shows, in part sectional plan, a steering gear as defined provided with a flexible dust-excluding sleeve of the invention.

Referring now to the drawing, the illustrated steering gear is intended for use on a motor vehicle and includes a rack rod 1 having one end portion (not shown) formed with transverse rack teeth in known manner. This rod 1 is arranged to extend laterally through side openings in a pinion casing 2, one of which openings communicates with a tubular casing extension part 3, which loosely surrounds the non-toothed part of the rack rod 1. At or near the outer end of the casing part 3, the rack rod is slidably supported by a bearing bush (not shown) and the outer end of the casing part 3 is sealed against the ingress of dust and dirt by an end cap 4. A further end cap 4 is similarly arranged to seal off the side opening in pinion casing 2 remote from the extension 3.

To enable the rack 1 to be connected with a steering linkage, an axial closed slot 5 is formed through the tubular casing part 3 intermediate the ends of the latter. Opposite this slot 5, two tapped axially spaced bolt holes 6 are formed diametrically through the rack. Screwed into these rack holes 6, through the slot 5 in the casing part 3, are headed bolts 7 which are of such length that the head ends 7a thereof then overhang outside the casing. The axial length of the casing slot 5 is such that full range of rack movement within the casing can still take place in either direction from a centered position, when the bolts 7 are screwed home.

The two bolts 7 are conveniently connected at their head ends, externally of the casing, by rigid link means 8 and are conveniently provided at the head ends with non-metallic bushes 9. These bushes are fitted into the boss ends of steering rods or links 10 which then extend from the bolts respectively in opposite directions, lengthwise of the rack, for connection with other parts of the steering linkage.

In order to prevent dust and dirt entering the rack casing through the slot 5 and around the bolts 7, a flexible dust excluding sleeve, having corrugated end sections 11 and preferably a plain center section 12, is engaged around the casing part 3. The axial length of this flexible sleeve is greater than the axial length of the casing slot 5 and a lip is conveniently provided at each end of the flexible sleeve to receive an encircling clamp 13, whereby the flexible sleeve ends are clamped around the casing at opposite ends of the slot 5.

To accommodate the bolts 7, the plain center section 12 of the flexible sleeve is provided with two bolt holes which can be registered with the internally tapped bolt holes 6 in the rack. The sleeve bolt holes are each defined by an inwardly projecting cylindrical flange 14 therearound which is of sufficient axial length to project into the slot 5. Each of these flanges 14 is reinforced and stiffened by an encircling metallic or non-metallic collar 15 which is engaged therearound and extends over the full axial length of the flange.

The collars 15 may be a press fit on the flanges, or may be bonded or otherwise secured therearound in any convenient manner, and may have an external diameter such that a clearance is provided between the collars and upper and lower edges of the casing slot 5, to avoid rubbing contact during displacement of the rack. The collars 15 are, however, arranged to abut opposite ends of the slot at the extremes of rack travel to provide cushioned limiting stops which reduce shock loads on the rack teeth and on the pinion teeth.

The dimensioning of the flanged bolt holes is such that a dust-proof seal is formed thereby around the respective bolts. The provision of the reinforcing collars 15 also ensures that the flange bolt holes cannot expand or become distorted, in transmitting rack displacement to the sleeve, even under low temperature conditions in which the sleeve tends to become slightly less flexible despite the corrugations 11.

I claim:

1. For use with a rack and pinion steering gear in which the rack is axially movable in a housing having an axially slotted wall and is connectible with steering links by overhanging bolts engaging the rack through said housing wall slot, an axially collapsible dust-excluding sleeve adapted to enclose said slotted housing wall and formed with holes for the passage therethrough of said bolts, means for clamping said sleeve around said housing wall beyond opposite ends of said slot and reinforced projecting flange means which respectively define said bolt holes and provide a sealing fit around the respective bolts.

2. A flexible dust-excluding sleeve as claimed in claim 1 in which said flange means around the bolt holes project inwardly of the sleeve and into the housing slot, when the sleeve is positioned around the slotted housing wall as aforesaid, so as to provide cushioned limiting stops against opposite ends of the slot to limit rack travel.

3. A flexible dust-excluding sleeve as claimed in claim 1 in which said sleeve has corrugated sections at each end and a center plain section with bolt holes therethrough, and in which each said bolt hole is defined by an inwardly projecting annular flange.

4. A flexible dust-excluding sleeve as claimed in claim 3 in which said bolt hole flanges are reinforced by encircling stiffening collars.

5. In a rack and pinion steering gear in which the rack is axially movable in a housing having an axially slotted wall and is connectible with steering links by overhanging bolts engaging the rack through said housing wall, an axially collapsible dust-excluding sleeve encircling said housing in the region of said slotted wall and formed with bolt holes for said bolts, means clamping said sleeve around said housing at locations beyond opposite ends of said slot and internal reinforced flanges on said sleeve which form seals around the respective bolts and project into said slot.

References Cited in the file of this patent

UNITED STATES PATENTS 2,378,046     Stergis _____ June 12, 1945

FOREIGN PATENTS 1,181,598     France _____ Jan. 12, 1959